United States Patent
Harned et al.

[11] 3,720,447
[45] March 13, 1973

[54] HYDRAULIC ANTI-LOCK BRAKE CONTROL SYSTEM

[75] Inventors: John L. Harned, Grosse Pointe Woods; Laird E. Johnston, Birmingham, both of Mich.

[73] Assignee: General Motors Corporation, Detroit, Mich.

[22] Filed: Sept. 30, 1971

[21] Appl. No.: 185,088

[52] U.S. Cl. ............. 303/21 B, 188/181 C, 303/21 F
[51] Int. Cl. ................................................. B60t 8/06
[58] Field of Search ...188/181 A, 181 C; 303/21 BB, 303/21 EB, 21 C, 21 CG, 21 F, 21 P, 21 B, 21 BE

[56] References Cited

UNITED STATES PATENTS

| | | | |
|---|---|---|---|
| 2,869,687 | 1/1959 | Keim et al. | 303/21 BB |
| 2,975,003 | 3/1961 | Sandor | 303/21 B |
| 3,264,039 | 8/1966 | Cadiou | 303/21 BB X |
| 3,269,781 | 8/1966 | Van House | 303/21 BB X |

Primary Examiner—Milton Buchler
Assistant Examiner—John J. McLaughlin
Attorney—W. E. Finken et al.

[57] ABSTRACT

The invention utilizes a wheel speed proportional pressure generated by a transmission governor or equivalent means and a vehicle ground speed pressure provided by a vehicle ground speed computer and provides a hydraulic anti-lock brake system including a fluid pressure operated wheel brake, an operator actuated master cylinder, a hydraulic actuator which determines the level of brake pressure at the wheel brake, a control valve which modulates the wheel speed pressure to provide a regulated pressure proportional to the amount by which the master cylinder pressure exceeds the brake pressure, and a servo valve which amplifies the regulated pressure to provide a control pressure which operates the hydraulic actuator. The servo valve also compares the regulated pressure with the vehicle ground speed pressure and varies the control pressure in response to the wheel slip condition so as to provide a nearly constant wheel slip.

3 Claims, 4 Drawing Figures

3,720,447

HYDRAULIC ANTI-LOCK BRAKE CONTROL SYSTEM

CROSS-REFERENCE TO RELATED APPLICATION

The hydraulic anti-lock brake control system of this invention is used in conjunction with the Hydraulic Vehicle Ground Speed Computer claimed in our copending patent application Ser. No. 185,086 (Docket No. A-15,498), filed Sept. 30, 1971 filed on even date herewith and assigned to the common assignee. The vehicle ground speed computer provides a pressure which is proportional to the vehicle speed relative the ground.

BACKGROUND OF THE INVENTIOn

The invention relates to an anti-lock brake control system and more particularly to an all-hydraulic wheel slip control system which prevents wheel lockup by modulating the brake pressure to provide nearly constant wheel slip.

It is well known that the lateral friction coefficient between a vehicle tire and the road surface decreases rapidly when the braking torque generated by an excessive brake pedal actuation causes the vehicle wheel to depart from the free rolling condition and approach the locked wheel condition. The decrease in the lateral friction coefficient as excessive braking causes an increase in wheel slip is commonly evidenced by impaired vehicle directional stability. It is therefore desirable to limit the decrease in lateral friction coefficient by controlling the brake pressure so as to maintain the wheel slip at some acceptable value. The present invention operates on the slip control principle, continuously varying wheel speed so as to maintain a preselected fixed ratio between the vehicle ground speed and the wheel speed during periods of excessive brake actuation of the vehicle operator. The present invention provides wheel slip control through proportional modulation of the brake pressure as compared to the more common on-off, or binary control.

SUMMARY OF THE INVENTION

The present invention provides a hydraulic anti-lock control system including a fluid pressure operated wheel brake, an operator actuated master cylinder, a hydraulic actuator which determines the level of brake pressure at the wheel brake, a control valve which modulates the wheel speed pressure to provide a regulated pressure proportional to the amount by which the master cylinder pressure exceeds the brake pressure, and a servo valve which amplifies the regulated pressure to provide a control pressure which operates the hydraulic actuator. The servo valve also compares the regulated pressure with the vehicle ground speed pressure and varies the control pressure in response to the wheel slip condition so as to provide a nearly constant wheel slip. Furthermore, the invention provides a bypass valve which communicates the master cylinder pressure directly to the wheel brake at master cylinder pressures below a predetermined level and a low speed cutout valve which communicates master cylinder pressure directly to the wheel brake at vehicle speeds below a predetermined level. A check valve prevents the brake pressure from ever exceeding the master cylinder pressure.

BRIEF DESCRIPTION OF THE DRAWINGS

The many objects and advantages of the present invention will become apparent upon consideration of the following description and the accompanying drawings in which.

DESCRIPTION AND OPERATION OF THE GOVERNOR

Figure 1A:
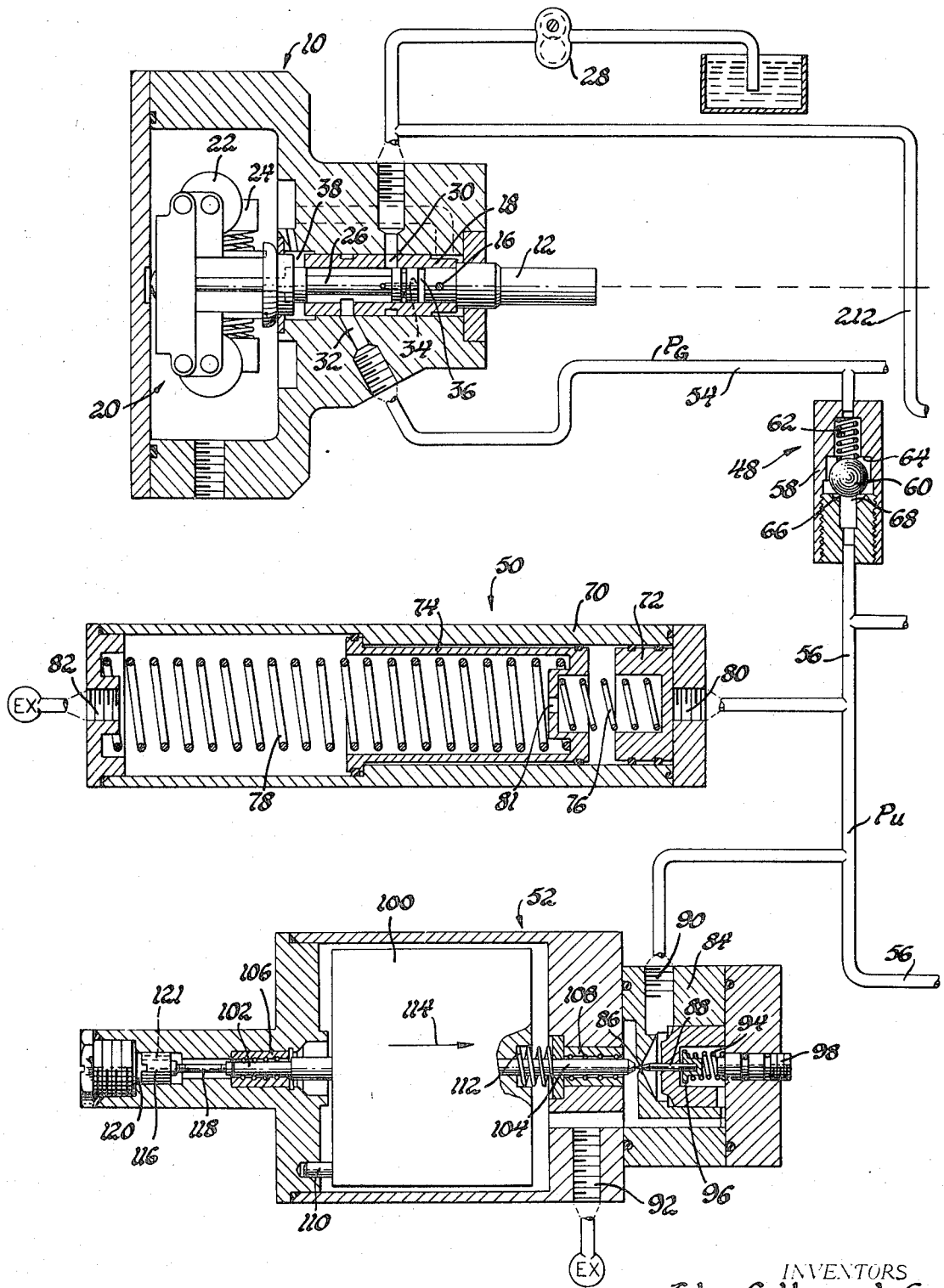
FIG. 1a illustrates the transmission governor and the hydraulic vehicle ground speed computer having parts broken away and in section.

Referring to FIG. 1a, the transmission governor generally indicated at 10 includes an input shaft 12 which is connected through the transmission output shaft and differential to the rear wheels, one of which is indicated at 14, so as to be driven at the average rear wheel speed. A roll pin 16 attaches the input shaft 12 to a sleeve 18 which is in turn connected to a flyweight assembly indicated generally at 20. The flyweight assembly 20 includes a primary weight 22 and a secondary weight 24 which act through a lever arrangement to provide a rightward acting force on a valve spool 26 which is proportional to the square of the velocity of the rotating weights. The spool 26 responds to this force by opening fluid communication between the governor outlet port 32 and the transmission line pressure generated by pump 28 and communicated to the governor supply port 30. The governor outlet or wheel speed pressure at port 32, hereinafter referred to as $P_G$, is communicated through an orifice 34 in spool 26 to a chamber 36 at the rightward end of spool 26. $P_G$ rises until the pressure in chamber 36 exerts a force on the rightward end of spool 26 equal to the centrifugal force resultant acting on the leftward end of valve spool 26. When the wheel speed subsequently decreases and the flyweight generated force decreases, the spool 26 acts as a regulating valve since $P_G$ within the chamber 36 moves valve spool 26 leftwardly opening fluid communication between outlet port 32 and an exhaust port 38. Thus, the governor continually responds to keep the spool 26 in equilibrium, producing a $P_G$ proportional to the square of the governor's angular speed.

Figure 2:
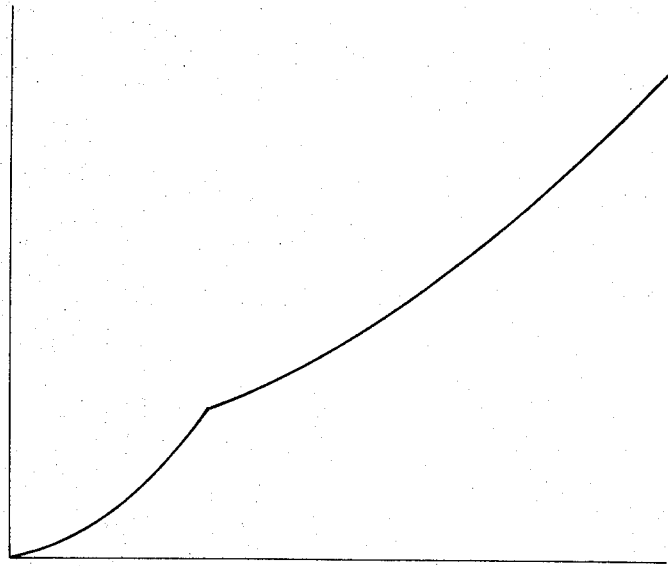
FIG. 2 is a graph of wheel speed pressure versus wheel speed and ground speed pressure versus vehicle speed.

The primary weights 22 and secondary weights 24 function to provide the two-stage pressure versus speed characteristic shown in the graph of FIG. 2. During operation up to the knee of the curve, the primary and secondary weights operate as a single weight. When the wheel speed reaches the knee of the curve, the primary weights have become grounded and with any additional speed the force acting on spool 26 is increased only under the influence of the secondary weights 24. use of the two-stage characteristic for the governor extends its useful speed range by offering reasonable low speed sensitivity and a high speed maximum pressure range within the supply pressure limits of the transmission pump 28.

It is noted that as an alternative method of generating a wheel speed pressure, an automatic transmission type governor could be coupled directly to a vehicle wheel or could be connected to a pair of wheels by means of a differential driven by flexible cables and could regulate the pressure from any suitable hydraulic power source.

Figure 3:
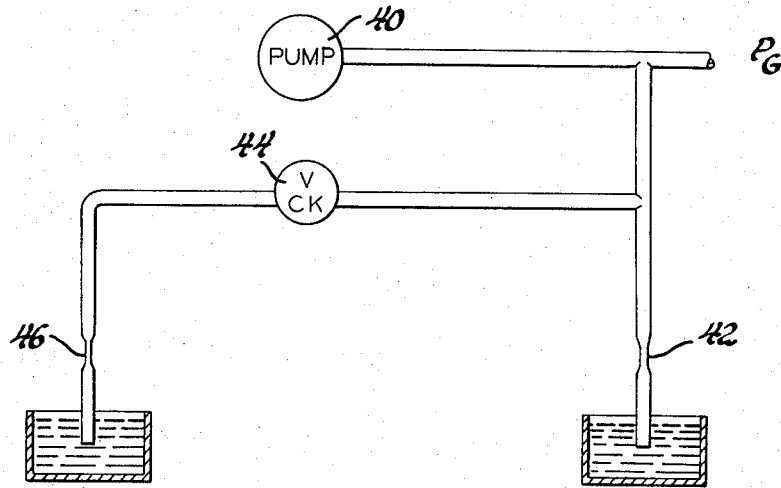
FIG. 3 is a schematic illustration of a wheel driven pump and orifice network which is equivalent to the transmission governor of FIG. 1.

An alternate apparatus for providing a wheel speed pressure signal is shown in FIG. 3. A wheel driven hydraulic pump 40 produces a fluid flow rate proportional to the wheel speed. Flow from pump 40 is communicated to a nonlinear orifice 42 which exhausts the fluid to a reservoir and results in the pressure versus speed relationship up to the knee of the curve of FIG. 2. When the pressure at the knee of the curve is reached, check valve 44 opens communicating flow to nonlinear orifice 46 and the resulting parallel flow through orifices 42 and 46 results in the pressure versus speed characteristic above the knee of the curve of FIG. 2.

DESCRIPTION AND OPERATION OF THE VEHICLE GROUND SPEED COMPUTER

The vehicle ground speed computer includes a check valve 48, an accumulator 50 and a decelerometer actuated valve 52. Conduit 54 communicates $P_G$ to the check valve 48 and conduit 56 connects the check valve 48 with the accumulator 50 and decelerometer actuated valve 52. Check valve 48 includes a housing 58 in which a ball valve 60 is located. A spring 62 seated at housing 58 engages ball valve 60 urging it away from a seat 64 and into engagement with abutment 66. Fluid passages 68 communicate fluid past ball 60 when it is seated at abutment 66 so that conduits 54 and 56 are connected. When the speed of wheel 14 decreases and consequently $P_G$ decreases, the resulting flow from conduit 56 to conduit 54 will overcome spring 62 and seat ball 60 at valve seat 64. Spring 62 is sized to be compressed when the flow rate is such as to indicate a certain predetermined rate of wheel deceleration, for example 32.2 feet per second squared or 1G.

Accumulator 50 includes a housing 70 in which pistons 72 and 74 are slidable. A variable rate spring 76, of helical variable pitch design, acts between pistons 72 and 74 and a second variable rate spring 78, also of helical variable pitch design, acts between piston 74 and housing 70. Springs 76 and 78 function to provide a two-stage construction which produces a nonlinear relationship between the position of piston 72 and the accumulator pressure so that a pressure versus speed curve of FIG. 2 is generated. The variable rate spring 78 is preloaded and the variable rate spring 76 is at its free length when the respective pistons are positioned as shown in FIG. 1a. The communication of $P_G$ to inlet port 80 of accumulator 50 moves piston 72 leftwardly compressing variable rate spring 76 until piston 72 engages piston 74. A further increase in $P_G$ urges pistons 72 and 74 unitarily leftward compressing the variable rate spring 78. Any fluid leakage past the seals of piston 72 is exhausted through hole 81 of piston 74 and exhaust port 82.

The decelerometer actuated valve 52 functions to exhaust pressure from accumulator 50 at a controlled rate which is proportional to the vehicle linear deceleration. A housing 84 forms a sharp edged hole 86 which in cooperation with a tapered needle 88 produces a flow restriction between an exhaust port 92 and a valve inlet port 90 which is connected to conduit 56. Tapered needle 88 is urged in the flow restricting direction relative to the sharp edged hole 60 by a spring 94 which engages the tapered needle 88 through the intermediary of cap 96. The preload of spring 94 is adjustable by virtue of its being seated on a pin 98 which threadedly engages housing 84. A sensor mass 100 includes pins 102 and 104 which are respectively supported on ball bushings 106 and 108. A pin 110 attached to sensor weight 100 engages a hole in housing 84 to prevent rotation of the sensor mass 100. The pins 102 and 104 are aligned with the vehicle longitudinal axis and the ball bushings 106 and 108 allow the sensor mass to move in this single degree of freedom. The end of pin 104 engages the tapered end of the tapered needle 88 so that movement of sensor mass 100 adjusts the position of tapered needle 88 and thus the flow through the sharp edged hole 86. A spring 112 acting between housing 84 and sensor mass 100 resists movement of sensor mass 100 in the direction of arrow 114 which indicates the direction of forward vehicle movement. A piston 116 having an orifice 121 therethrough is attached to pin 102 by a rod 118 and operates in a closed chamber 120 to provide damping of sensor mass 100 which prevents undesired oscillations. The flow area between tapered needle 88 and the sharp edged hole 86 varies nearly linearly with the vehicle linear deceleration force acting upon sensor mass 100. The selection and adjustment of springs 94 and 112 is made in a somewhat nonlinear manner so as to compensate for the behavior of the flow pattern around needle 88. The combined spring rate of these two springs increases as the needle opens, thus decreasing the deceleration sensitivity as deceleration increases.

In operation, the pressure in the accumulator 50, hereinafter referred to as $P_U$, is equal to $P_G$ when the vehicle wheels are either decelerating at normal rates or accelerating. When the pressure difference across check valve 48 is indicative of a wheel deceleration in excess of 1G or some other predetermined level, conduit 56 is isolated from conduit 54. The pressure in accumulator 50, $P_U$, is exhausted at a controlled rate proportional to the vehicle linear deceleration through the deceleration actuated valve 52. The springs 76 and 78 of accumulator 50 function to provide the $P_U$ versus vehicle ground speed characteristic of FIG. 2. Thus, the cooperation of check valve 48, accumulator 50, and the decelerometer actuated valve 52 provides a pressure $P_U$ in conduit 56 which is proportional to the vehicle ground speed or, in other words, proportional to the $P_G$ which would exist if there were no wheel slip.

DESCRIPTION AND OPERATION OF THE BRAKE CONTROL CIRCUIT

Figure 1B:
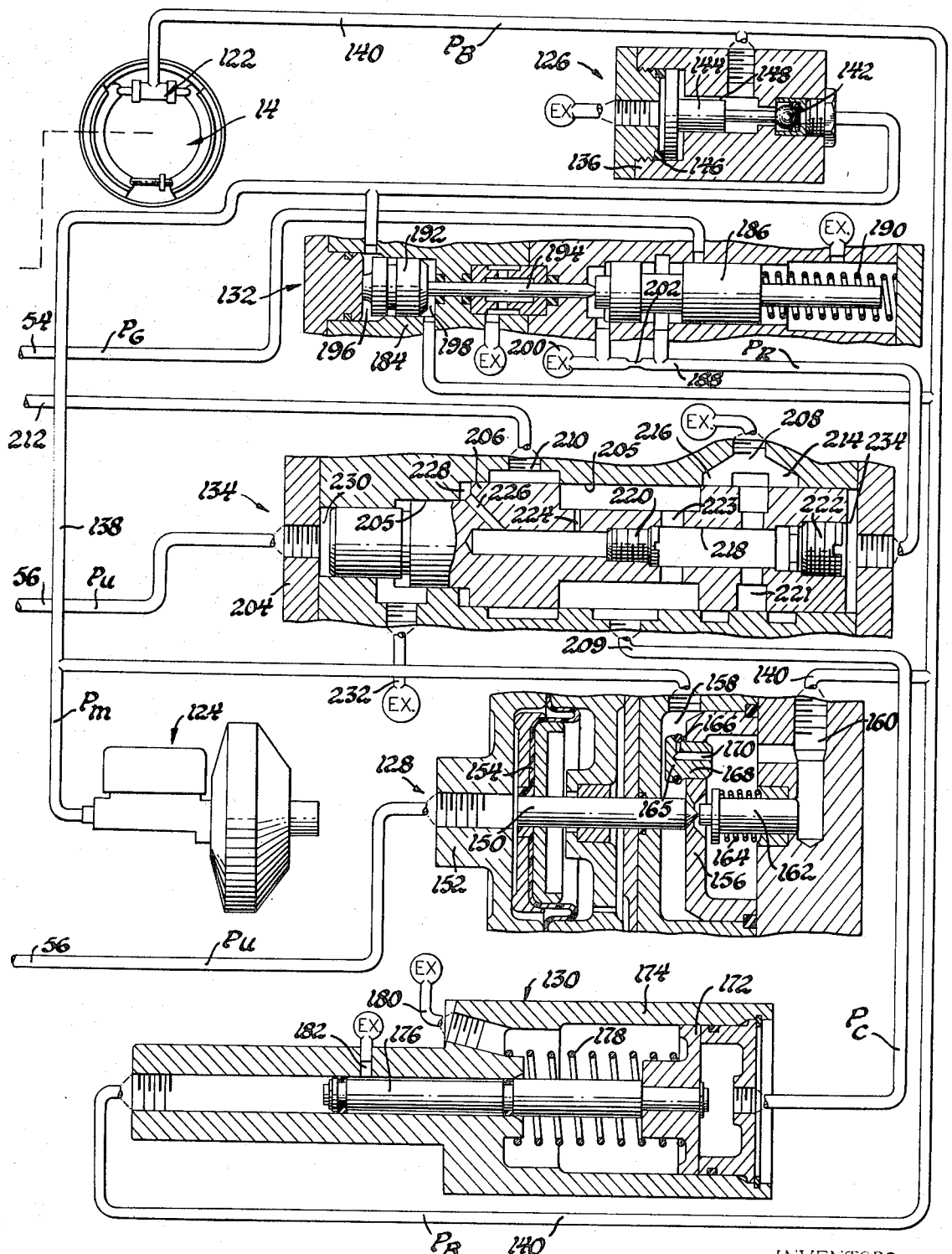
FIG. 1b illustrates the hydraulic anti-lock brake control system having parts broken away and in section.

In general, the anti-lock brake control circuit of FIG. 1b includes a wheel brake 122 which imparts a braking torque to the wheel 14 in proportion to the brake fluid pressure, hereinafter referred to as $P_B$, communicated thereto; an operator-actuated power-boosted master cylinder 124 which generates a master cylinder pressure, hereinafter referred to as $P_M$; a bypass valve 126 which communicates $P_M$ directly to the wheel brake 122 only up to a predetermined level of $P_M$; a low speed cutout valve 128 which communicates $P_M$ directly to the wheel brake 122 only at vehicle speeds below some predetermined level; a hydraulic actuator 130 which determines the level of $P_B$ at brake pressures above the pressure threshold of bypass valve 126 and at speeds above the speed threshold of low speed cutout valve 128; a control valve 132 which modulates $P_G$ to provide a regulated pressure, hereinafter referred to as $P_R$, proportional to the amount by which $P_M$ exceeds $P_B$; and a servo valve 134 which amplifies $P_R$ to provide a control pressure, hereinafter referred to as $P_C$, for operation of the hydraulic actuator 130 and which also compares $P_R$ with the vehicle ground speed pressure signal $P_U$ and varies $P_C$ in response to the wheel slip condition so as to provide a nearly constant wheel slip.

THE BYPASS VALVE

The bypass valve 126 includes a housing 136 which is connected to the master cylinder 124 by conduit 138 and to the wheel brake 122 by a conduit 140. A check valve 142 in housing 136 blocks communication of $P_M$ from master cylinder 124 to wheel brake 122 when seated. A piston 144 in housing 136 is urged by a spring force generated by seal 146 to hold check valve 142 unseated so that $P_B$ equals $P_M$. A passage 148 communicates $P_M$ to the piston 144 and when the pressure force of $P_M$ exceeds the spring force of seal 146, piston 144 is moved allowing check valve 142 to seat and thus isolating $P_M$ from $P_B$. The pressure threshold of bypass valve 126 is selected to be above that $P_B$ required to take up brake shoe clearance and yet is below that $P_B$ required to develop a significant brake torque.

THE LOW SPEED CUTOUT VALVE

A second direct path between master cylinder 124 and wheel brake 122 is provided through the low speed cutout valve 128. A tapered plunger 150 is slidable in housing 152 and attached to a diaphragm 154. A valve seat 156 formed in housing 152 connects fluid passages 158 and 160 which are respectively connected to $P_M$ conduit 138 and $P_B$ conduit 140. a hydraulically balanced piston 162 is slidable in housing 152 and is biased by spring 164 into engagement with the tapered end of plunger 150. Spring 164 acts through piston 162 to hold the plunger 150 unseated relative to the valve seat 156 until $P_U$ which is communicated to diaphragm 154 by conduit 56 increases sufficiently to provide a pressure force on plunger 150 which exceeds the spring force of spring 164. Thus the low speed cutout valve 128 functions to provide a $P_B$ equal to $p_m$ until the vehicle reaches a predetermined speed threshold during acceleration and then again provides a $P_B$ equal to $P_M$ during vehicle deceleration when the vehicle ground speed has been reduced below the speed threshold of the valve. The low speed cutout valve 128 also includes a check valve 165 which consists of an O-ring 166 seated in a groove on plug 168 situated in the wall of housing 152 between $P_M$ passage 158 and $P_B$ passage 160. A passageway 170 in plug 168 is closed by O-ring 166 when $P_M$ exceeds $P_B$ and is opened when a $P_B$ in excess of $P_M$ lifts the O-ring 166 from the plug 168. Thus the check valve 165 prevents $P_B$ from exceeding the level of braking being called for by $P_M$.

THE HYDRAULIC ACTUATOR

The hydraulic actuator 130 serves as a hydraulic ram which generates a $P_B$ in proportion to the $P_C$ acting thereon. The hydraulic actuator 130 includes a piston 172 which is sealingly movable in housing 174 in response to $P_C$ acting thereon. A piston rod 176 is sealingly slidable in housing 174 and forms a movable wall of $P_B$ conduit 140. The piston rod 176 is attached to piston 172 so that $P_C$ and $P_B$ act on the pistons in opposing directions. A spring 178 is seated on housing 174 and urges the pistons to a rest position in the housing when $P_C$ equals 0. The ratio of $P_B$ to $P_C$ is determined by ratio of the end areas of piston rod 176 and piston 172. Leakage of $P_C$ past piston 174 and leakage of $P_B$ past piston rod 176 is respectively exhausted through exhaust ports 180 and 182.

THE CONTROL VALVE control valve 132 modulates $P_G$ to provide a regulated pressure $P_R$ and includes a housing 184 in which a spool valve 186 is slidable to selectively block or permit communication of $P_G$ in conduit 54 to $P_R$ conduit 188. A spring 190 urges spool 186 to block communication of $P_G$ to $P_R$ conduit 188. A piston 192 is also slidable in housing 184 and includes an extension 194 which extends sealingly through the housing 184 into engagement with the end of spool 186 opposite spring 190. Conduit 140 communicates $P_B$ to chamber 198 formed on the side of piston 192 having the extension 194 and $P_M$ is communicated through conduit 138 to a chamber 196 formed on the other side of piston 192. With $P_M$ at zero, the spring 190 forces spool 186 to the left as limited by the engagement of piston 192 with housing 184. In this position $P_G$ is blocked and so $P_R$ equals zero due to its communication to exhaust port 200 through orifice 202. When the operator actuates master cylinder 124, $P_M$ increases from zero generating a pressure force urging piston 192 and spool 186 to the right. When the preload of spring 190 is exceeded $P_G$ is communicated to the conduit 188. The resulting $P_R$ in conduit 188 acts through the servo valve 134 and hydraulic actuator 130 to increase $P_B$ as will be hereinafter described. The resulting $P_B$ in turn acts on the leftward end of piston 192 and opposes the $P_M$ acting on the rightward end thereof. This feedback of $P_B$ to control valve 132 causes spool 186 to modulate the input $P_G$ so that the output $P_R$ is proportional to the amount by which $P_M$ exceeds $P_B$.

The Servo Valve

Servo valve 134 includes a housing 204 having a stepped bore 205 in which a spool 206 is slidable to alternately connect $P_C$ conduit 209 with either the exhaust port 208 or a supply port 210. Supply port 210 is connected by conduit 212 to the transmission pump 28, or an equivalent hydraulic fluid source. The exhaust port 208 includes double exhaust annuli 214 and 216 machined in the housing 204. A stepped bore 218 is provided in spool 206 and is divided into two separate chambers by threaded plugs 220 and 222. Radial passages 221 and 223 are drilled in the spool 206 so that even slight rightward movement of spool 206 from the centered position as shown in FIG. 1b opens a substantial flow path from $P_C$ conduit 209 to exhaust port 208. A radial passage 226 and an orifice 224 cooperate with bore 218 to communicate the $P_C$ from conduit 209 to a chamber 228 formed by the stepped bore 205 of housing 204 and a shoulder of spool 206. Additionally, $P_U$ is communicated through conduit 56 to act on the cross-sectional end of spool 206 in chamber 230. Exhaust port 232 exhausts fluid leakage from chambers 228 and 230. Conduit 188 communicates $P_R$ to the chamber 234 at the rightward end of valve spool 206. When $P_R$ is zero, $P_U$ acting on the end of spool 206 in chamber 230 forces spool 206 rightwardly as limited by engagement with housing 204. Conduit 209 is thus communicated to exhaust port 208 and so $P_C$ in conduit 209 equals zero. When $P_R$ increases from zero and generates on spool 206 a force exceeding the opposing $P_U$ pressure force, the spool 206 is moved leftwardly opening communication of transmission line pressure in conduit 212 to $P_C$ conduit 209. $P_C$ in conduit 209 is thus increased and is communicated through passage 226 and orifice 224 to the chamber 228 where it acts on spool 206 to generate a feedback force. Thus, as $P_C$ increases, the unbalanced force caused by $P_R$ and $P_U$ is reduced to zero by the feedback force, and spool 206 is centered as shown in FIG. 1b. The feedback of $P_C$ to chamber 228 causes servo valve 134 to act as a proportional servo mechanism producing an output $P_C$ proportional to the unbalance force on spool 206 resulting from inputs $P_R$ and $P_U$. Thus, for a given value of $P_U$, $P_C$ increases proportionally to $P_R$ after the $P_R$ pressure force on spool 206 exceeds the $P_U$ pressure force. The ratio of a change of $P_C$ to a change of $P_R$ is determined by the ratio of the end area of spool 206 in chamber 234 to the end area in chamber 228.

Operation

During normal vehicle braking by the driver at vehicle wheel speeds above the threshold of low speed cutout valve 128 and at braking pressures above the threshold of bypass valve 126, the circuit functions to maintain a one-to-one relationship between $P_M$ and $P_B$. The servo valve 124 and control valve 132 function to provide a $P_C$ which will generate a $P_B$ equal to $P_M$ irrespective of the magnitude of $P_U$.

When the driver applies excessive pedal effort and the resulting $P_M$ calls for a $P_B$ which produces a brake torque that the tire-to-road friction cannot support, the wheel deceleration exceeds the vehicle deceleration and the wheel speed rapidly decreases while the wheel slip increases. The reduced wheel speed drives the governor 10 at a reduced speed and thus $P_G$ decreases in synchronism with the wheel speed. Check valve 48 closes in response to the rapidly decreasing $P_G$ and the decelerometer actuated valve 52 exhausts the accumulator pressure to produce the vehicle ground speed pressure $P_U$ as hereinbefore described. When $P_G$ falls to such an extent that it is no longer capable of producing the value of $P_R$ being called for by $P_M$, $P_M$ moves piston 192 and the spool 186 to the extreme rightward position causing $P_R$ to equal $P_G$. Thus $P_R$ decreases rapidly in synchronism with the wheel speed, servo valve 134 responds to the falling $P_R$ by rapidly decreasing $P_C$, and in turn the actuator 130 responds to the falling $P_C$ by rapidly decreasing $P_B$. The wheel is prevented from locking up since at lockup $P_G$ and thus $P_B$ would be at zero and the tire torque would accelerate the wheel as soon as the torque exceeded the brake torque. Thus, it can be seen that at some wheel speed below ground speed, an equilibrium point exists.

The system is made to seek an equilibrium point where the brake torque slightly exceeds tire torque to maintain the wheel decelerating in synchronism with the vehicle speed and at an approximately constant wheel slip. The opposed acting pressure inputs $P_R$, which is in fact $P_G$, and $P_U$ cause the servo valve to act as a linear summing pressure amplifier. Since $P_U$ decreases in synchronism with the decrease in vehicle ground speed the servo valve 134 causes the speed of the controlled wheel 14 to also decrease in synchronism with the vehicle ground speed. A suitable selection of the areas of valve spool 206 in chambers 230 and 234 provides a nearly constant wheel slip during a panic brake stop until the vehicle speed falls below the threshold setting of the low speed cutout valve 128.

When the vehicle ground speed pressure $P_U$ acting on diaphragm 154 of the low speed cutout valve 128 decreases to such an extent that the spring force of spring 164 exceeds the opposing pressure force, spring 164 moves the tapered plunger 150 away from valve seat 156 so that $P_M$ is communicated directly to the wheel brake 14. Spring 164 is preloaded to operate in a speed range of, for example, 5 to 15 miles per hour, thus assuring that vehicle braking is maintained whenever the low vehicle speed renders the hydraulic antilock system incapable of generating sufficient brake pressure.

It is noted that under some conditions the possibility exists where $P_B$ exceeds $P_M$. This can occur, for example, if the driver accelerates the vehicle through the threshold speed setting of low speed cutout valve 128 with his foot on the brake pedal producing some value of $P_B$. When valve 11 closes, this value of $P_B$ could remain trapped in the wheel brake 122 even though the vehicle driver removes all pedal effort. If this condition occurs, $P_B$ in passageway 170 of the check valve 165 lifts O-ring 166 from the plug 168 and $P_B$ is reduced to the level of $P_M$.

what is claimed is:

1. A vehicle brake control system effective to vary the wheel speed during high level braking to provide a substantially constant ratio of vehicle ground speed to wheel speed and comprising:

fluid pressure operated wheel brake means adapted to provide a braking torque in proportion to the brake pressure acting thereon;

means providing a fluid pressure proportional to the speed of at least one of the braked vehicle wheel;

a vehicle ground speed computer effective to provide a fluid pressure proportional to the vehicle ground speed;

pump means providing a continuous flow of pressurized operating fluid;

a master cylinder actuated by the vehicle operator and generating a fluid pressure;

control valve means acting to modulate the wheel speed pressure to provide a regulated pressure which is proportional to the amount by which the master cylinder pressure exceeds the brake pressure;

actuator means including a piston having one end in uninterrupted brake fluid communication with the wheel brake and providing a brake pressure proportional to the pressure acting on the other end thereof;

and servo valve means receiving the vehicle ground speed pressure and the regulated pressure as opposed acting input signals and functioning to modulate the pressurized operating fluid to produce a control pressure communicated to the other end of the actuator means piston, and control pressure feedback means in the servo valve means providing constant regulation of control pressure and maintaining proportionality to the unbalanced opposed acting input signals;

the control and servo valve means functioning during normal braking to provide a brake pressure equal to master cylinder pressure and when excessive master cylinder pressure causes wheel rotational deceleration in predetermined excess of vehicle linear deceleration, the control valve means and servo valve means provide a brake pressure which causes the wheel speed to fall in synchronism with and in less than unity proportion to the vehicle speed.

2. A vehicle brake control system effective to vary the wheel speed during high level braking to provide a substantially constant ratio of vehicle ground speed to wheel speed and comprising:

fluid pressure operated wheel brake means adapted to provide a braking torque in proportion to the brake pressure acting thereon;

means providing a fluid pressure proportional to the speed of at least one of the braked vehicle wheel;

a vehicle ground speed computer effective to provide a fluid pressure proportional to the vehicle linear speed;

pump means providing a continuous flow of pressurized operating fluid;

a master cylinder actuated by the vehicle operator and generating a fluid pressure;

actuator means including a piston having one end in uninterrupted brake fluid communication with the wheel brake and providing a brake pressure proportional to the pressure acting on the other end thereof;

control valve means providing a regulated pressure and including a housing, a wheel speed pressure inlet port, a regulated pressure output port, a valve spool slidable in the housing and spring held to block communication between the inlet and outlet ports, orifice means limitingly exhausting the regulated outlet pressure, means introducing master cylinder and brake pressures into the housing, means causing the master cylinder pressure to urge the valve spool to open communication between the inlet and outlet ports and the brake pressure to resist said urging, whereby the control valve means functions to modulate the wheel speed pressure to provide a regulated pressure proportional to the amount by which the master cylinder pressure exceeds brake pressure;

and servo valve means modulating the operating fluid pressure to provide a control pressure communicated to the other end of the actuating means and including a housing, an operating fluid inlet port, an exhaust port, a control pressure outlet port, a valve spool slidable in the housing and having a centered position blocking the outlet port from both the inlet and exhaust ports, means introducing the ground speed pressure into the housing to urge the valve spool to open communication of the control pressure outlet to the exhaust port, means introducing the regulated pressure into the housing to urge the valve spool to open communication between the control pressure outlet port and the operating fluid pressure inlet port, and feedback means including an orifice communicating the control pressure to urge the valve spool to open communication between the control pressure outlet port and the exhaust port, whereby the operating fluid pressure is regulated proportionally to the unbalanced pressures acting on the spool;

the control and servo valve means functioning during normal braking to provide a brake pressure equal to master cylinder pressure and when excessive master cylinder pressure causes wheel rotational deceleration in excess of vehicle linear deceleration, the control valve means and servo means provide a brake pressure which causes the wheel speed to fall in synchronism with and in less than unity proportion to the vehicle speed.

3. A vehicle brake control system effective to vary the wheel speed during high level braking to provide a substantially constant ratio of vehicle ground speed to wheel speed and comprising:

a fluid pressure operated wheel brake adapted to provide a braking torque in proportion to the brake pressure acting thereon;

means providing a fluid pressure proportional to the speed of at least one vehicle wheel;

a vehicle ground speed computer effective to provide a fluid pressure proportional to the vehicle linear speed;

pump means providing a continuous flow of pressurized operating fluid;

a master cylinder actuated by the vehicle operator and generating a fluid pressure;

bypass valve means connected fluidly intermediate the master cylinder and the wheel brake and including a check valve blocking fluid communication from the master cylinder to the wheel brake when seated, and spring biased piston means holding the check valve unseated until the brake pressure acting thereon reaches a predetermined level at which the pressure force exceeds the spring force to seat the check valve;

low speed cutout valve means connected fluidly intermediate the master cylinder and the wheel brake and including a valve seat, a valve member adapted to selectively block or permit fluid communication through the valve seat between the master cylinder and wheel brake, spring means holding the valve member unseated, piston means operatively engaging the valve means and means communicating the vehicle speed pressure to act on the piston and overcome the spring means when the vehicle is operating at speeds above a predetermined threshold;

and check valve means connected fluidly intermediate the master cylinder and the wheel brake and acting to prevent the brake pressure from ever exceeding the master cylinder pressure;

actuator means including a piston having one end in uninterrupted brake fluid communication with the wheel brake and providing a brake pressure proportional to the pressure acting on the other end thereof;

control valve means providing a regulated pressure and including a housing, a wheel speed pressure inlet port, a regulated pressure output port, a valve spool slidable in the housing and spring held to block communication between the inlet and outlet ports, orifice means limitingly exhausting the regulated outlet pressure, means introducing master cylinder and brake pressures into the housing, the master cylinder pressure urging the valve spool to open communication between the inlet and outlet ports and the brake pressure resisting said urging, whereby the control valve means functions to modulate the wheel speed pressure to provide a regulated pressure proportional to the amount by which the master cylinder pressure exceeds brake pressure;

and servo valve means modulating the operating fluid pressure to provide a control pressure communicated to the other end of the actuating means and including a housing, an operating fluid inlet port, an exhaust port, a control pressure outlet port, a valve spool slidable in the housing and having a centered position blocking the outlet port from both the inlet and exhaust ports, means introducing the ground speed pressure into the housing to urge the valve spool to open communication of the control pressure outlet to the exhaust port, means introducing the regulated pressure into the housing to urge the valve spool to open communication between the control pressure outlet port and the operating fluid pressure inlet port, and feedback means including an orifice communicating the control pressure to urge the valve spool to open communication between the control pressure outlet port and the exhaust port, whereby the operating fluid pressure is regulated proportionally to the unbalanced pressures acting on the spool;

the control and servo valve means functioning during normal braking to provide a brake pressure equal to master cylinder pressure and when excessive master cylinder pressure causes wheel rotational deceleration in excess of vehicle linear deceleration, the control valve means and servo means provide a brake pressure which causes the wheel speed to fall in synchronism with and in less than unity proportion to the vehicle speed.

* * * * *